United States Patent Office 2,964,534
Patented Dec. 13, 1960

2,964,534

PROCESS FOR THE PREPARATION OF GLUTAMIC ACID

Robert H. Sullivan, Woodbury, N.J., assignor to E. I. du Pont de Nemours and Company, Wilmington, Del., a corporation of Delaware No Drawing. Filed Jan. 14, 1958, Ser. No. 708,755

11 Claims. (Cl. 260—326)

The present invention relates to an improved chemical synthesis and, more particularly, to an improved process for the preparation of DL-glutamic acid (hereafter called glutamic acid).

In my application Serial Number 526,325, filed August 3, 1955, now U.S. Patent 2,801,250, I described a process for the preparation of glutamic acid, also known as α-aminoglutaric acid, from dicyclopentadiene. As stated therein, the dicyclopentadiene first is converted thermally to cyclopentadiene and the cyclopentadiene is treated with hydrogen chloride to produce 3-chlorocyclopentene. The chlorocyclopentene, in turn, is converted to 3-aminocyclopentene. Essential further steps in the process of my earlier invention are the conversion of the amino group of the 3-aminocyclopentene to an oxidation-resistant substituent by reaction with an organic acid or amide-forming derivative; oxidation of the resultant N-substituted 3-aminocyclopentene by a chemical oxidant to form the N-substituted glutamic acid; and hydrolysis of the N-substituted acid to glutamic acid.

My earlier patent shows that the oxidation step opens the alicyclic ring of the N-substituted 3-aminocyclopentene at its double bond and converts the compound to a five-membered chain having terminal carboxyl groups and the substituted nitrogen alpha to one of the carboxyl groups. However, while this is the primary reaction, the formation of the N-substituted glutamic acid by this process is always accompanied to a certain extent by oxidative degradation of the carbon chain with formation of the homologous N-substituted-DL-aspartic acid. (Hereafter DL-aspartic acid is called simply aspartic acid.) Neither the mixture of N-substituted glutamic acid and N-substituted aspartic acid nor the mixture of glutamic acid and aspartic acid obtained on subsequent hydrolysis is easy to separate into its components because of the similarity of properties of the pairs in each case. Furthermore, I have discovered that in addition to the formation of the N-substituted aspartic acid, the use of nitric acid as the oxidizing agent in my earlier process often results in additional yield losses because of the formation of the dinitro derivative of the formula:

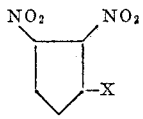

(wherein X is the substituted amino group).

Accordingly, an object of the present invention is to provide an improved process for the synthesis of glutamic acid. Another object is to provide a process for the synthesis of glutamic acid whereby by-product formation is substantially avoided. A still further object is to provide an economical process for the synthesis of glutamic acid in high yields. Other and additional objects will become apparent as the invention is further described.

I have found that the foregoing objects may be achieved when I include as essential steps in the preparation of glutamic acid the addition of a molecule of water across the double bond of the alicyclic ring of one of the N-substituted 3-aminocyclopentenes of my prior invention to produce an N-substituted 3-aminocyclopentanol and the oxidation of the latter compound. In accordance with the process of the present invention, this hydration may be accomplished by dissolving the N-substituted 3-aminocyclopentene in sulfuric acid having a concentration of at least about 85% and adding the resulting solution to water or to aqueous sulfuric acid to form an N-substituted 3-aminocyclopentanol. After conversion of the N-substituted 3-aminocyclopentene to the N-substituted 3-aminocyclopentanol, as will be described more fully hereinafter, the N-substituted 3-aminocyclopentanol is oxidized, the alicyclic ring opening to yield the N-substituted α-amino dicarboxylic acid essentially exclusively. The latter acid then is hydrolyzed to the α-amino acid, e.g., by one of the methods described in my prior patent. The hydration and oxidation steps of my present improved process for obtaining glutamic acid may be illustrated generally by the following equations:

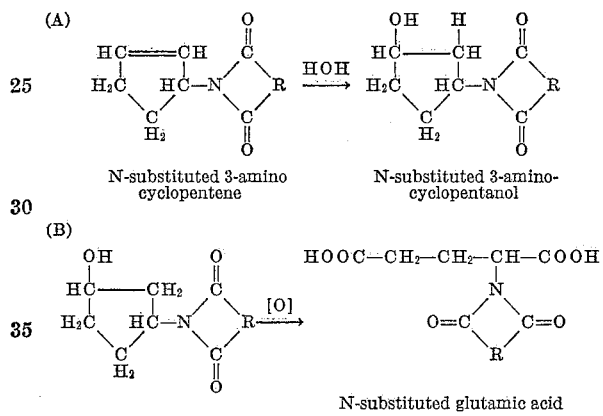

Thus, for purposes of discussion, my improved process may be considered to consist of the two steps shown in Equations A and B above. The N-substituted 3-aminocyclopentene of Step A may be prepared in accord with my earlier invention, and the N-substituted glutamic acid product of Step B likewise may be hydrolyzed by the methods shown in my prior patent. The following examples, in which the parts are by weight, illustrate the foregoing reactions but are not to be construed as limiting the invention in any manner. The conversions reported therein express (in percent) the relationship between the amounts (moles) of product produced and the amounts theoretically obtainable, based on the amount of indicated starting material introduced.

Example 1

Nineteen (19) parts of N-(3-cyclopentenyl)phthalimide prepared in accord with my prior patent was added slowly and with rapid agitation to 50 parts of concentrated (95%) sulfuric acid which had been cooled to between 0 and +8° C. and was maintained in this range during the addition. Following the addition, the mixture was stirred at 0–8° C. for approximately thirty minutes or until all the N-(3-cyclopentenyl)phthalimide had dissolved. The resulting solution was poured into 250 parts of ice water, and the mixture was agitated for about one hour. The precipitate which formed was separated by filtration, and the resulting cake was washed with water until free of sulfuric acid and then dried. The crude N-(hydroxycyclopentyl)phthalimide, M.P. 112–116° C., obtained amounted to 14.6 parts (or approximately 70% conversion, based on the N-(3-cyclopentenyl)phthalimide introduced).

For purposes of identification, the crude N-(3-hydroxycyclopentyl)phthalimide was purified according to the following procedure. The crude material was dissolved in benzene, and the small amount of benzene-insoluble impurities present was removed. The solids-free benzene solution was twice passed through an adsorbent charcoal, and the benzene then was removed. The solid which remained was dissolved in methanol and the charcoal treatment was repeated. The methanol-free, dried N-(hydroxycyclopentyl)phthalimide, M.P. 120 – 123° C., amounted to 7.5 parts (or a recovery of approximately 50%, based on the crude hydroxycyclopentylphthalimide introduced). Elemental analysis of the purified product showed the following results:

Calcd. for $C_{13}H_{13}NO_3$: Percent C, 67.52; percent H, 5.67; percent N, 6.06. Found: Percent C, 67.76, 67.53; percent H, 5.55, 5.60; percent N, 5.99, 6.22.

The purified material had neutralization equivalents of 230.3 and 231.5, respectively, in two determinations; the theoretical value is 231.2.

In the foregoing reaction, the hydration of the double bond of the alicyclic ring in the N-(3-cyclopentenyl)-phthalimide molecule theoretically could occur to give the 2- or the 3-hydroxy derivative or a mixture of these isomers. The hydration product of the present invention was shown to be one compound and not a mixture of isomers by examination of the infrared spectra of the first and last of fourteen fractions obtained by fractional crystallization of 50 parts of the hydration product from a water-methanol mixture. Although the melting points varied between 114–114.5° C. for the first fraction to 120–121° C. for the last, indicating the presence of some impurities, fractions 1 and 14 had infrared spectra identical in every major band and intensity and thus were the same compound. In addition, p-nitrobenzoates prepared from each of these fractions had identical melting points, 182–183° C., and the mixed melting point was not depressed.

Next to be determined was whether the single compound had the hydroxyl substituent in the 2- or 3-position of the alicyclic ring. The hydration product of the present invention was shown to be neither N-(cis-2-hydroxycyclopentyl)phthalimide nor N-(trans-2-hydroxycyclopentyl)-phthalimide by the fact that each of these compounds, prepared by other procedures, depressed the melting point of the hydration product. In addition, major differences existed in the infrared spectra of the present hydration product and those of the N-(cis-2- and N-(trans-2-hydroxycyclopentyl)phthalimides. Therefore, the hydroxyl substituent had to be in the 3-position of the alicyclic ring.

While I do not wish to be limited by any theoretical discussion as to whether the hydroxyl group is cis or trans with respect to the substituted amino group, I believe that the product of Example 1 is N-(cis-3-hydroxycyclopentyl)phthalimide. Examination of the free hydroxyl group absorbance band ($2.90\mu$) of infrared spectra of the hydration product indicated the existence of strong intramolecular hydrogen bonding even when the hydration product was present as a dilute solution. A consideration of the following molecular diagrams shows that such intramolecular hydrogen bonding would indicate the cis-1,3-isomer.

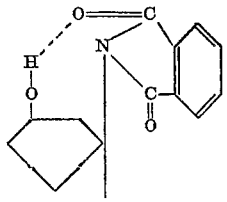

cis-1,3-isomer

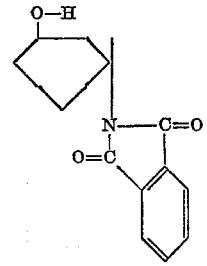

trans-1,3-isomer

Example 2 shows the preparation of the N-(3-hydroxycyclopentyl)phthalimide on a somewhat larger scale.

*Example 2*

Thirty-three (33) pounds of 98% sulfuric acid in a 10-gallon stainless steel reactor provided with a jacket and an agitator was cooled to about 0° C. by pumping brine coolant through the jacket while agitating the acid. Ten (10) pounds of N-(3-cyclopentenyl)phthalimide then was added over the course of about thirty minutes, the temperature of the mixture being maintained at approximately 0° C. during the addition. Following this addition, the mixture was agitated for about four hours or until all the phthalimide had dissolved. The product of this step was a brown, viscous solution. For convenience, this product was divided in half, and the halves were added over the course of one hour and with agitation to separate vessels (of the type used in the reaction with sulfuric acid), each containing 65 pounds of cold (ca. 0° C.), zeolite-treated water. After the additions, the resulting slurries were agitated for about 2 hours at 0° C. The products then were centrifuged, and the solid material recovered was combined and thereafter washed with water until free of sulfuric acid. The dried, sulfuric acid-free product, N-(3-hydroxycyclopentyl)phthalimide, was recovered in a conversion of 89%, based on the N-(3-cyclopentenyl)phthalimide introduced.

As Examples 3 and 4 show, the hydration procedure of the present invention is applicable not only to N-(3-cyclopentenyl)phthalimide but also to 3-aminocyclopentenes having one or both of the amine hydrogens replaced by reaction with other organic acids or their amide-forming derivatives. As was the case in the process of my earlier patent, these acids, whether mono-basic or polybasic, should not contain any readily oxidizable function if the hydrated product is to be subjected to oxidation.

*Example 3*

Ten (10) parts of N,N-di(3-cyclopentenyl)pyromellitimide prepared essentially in the manner shown in my aforementioned patent was added with agitation to 30 parts of concentrated sulfuric acid which had been chilled to 0° C.; the temperature of the mixture did not exceed about +10° C. during the addition. Following the addition, the mixture was maintained at about 10° C. during an additional hour of stirring or until the pyromellitimide was completely dissolved. The resulting soluting solution then was added slowly to 300 parts of ice water. The solid which precipitated was recovered by filtration and was washed with 5% sodium bicarbonate solution and then with water. The water-washed material was dried over phosphorus pentoxide, and the dried product was recrystallized from a 4/1 mixture of N,N-dimethylformamide and ethanol. The resulting white crystals were washed with ether and dried, M.P. 272–274° C. Elemental and infrared analyses indicated that the product was N,N'-bis(3-hydroxycyclopentyl)pyromellitimide, which may be represented as:

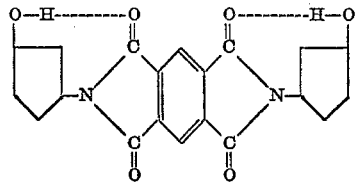

*Example 4*

N-(3-cyclopentenyl)succinimide in the amount of 10 parts was added slowly to 30 parts of concentrated sulfuric acid which had been cooled and was maintained in the range of about −5 to about +55° C. during the addition. The procedure of Example 3 then was followed, the liquid product being added to 200 parts of ice water. A homogeneous solution resulted. This solution was extracted several times with benzene and the combined benzene extracts were washed with 5% sodium bicarbonate solution and then with water. The water-washed benzene solution was dried over magnesium sulfate and then evaporated to dryness. A light-brown oil remained which crystallized when cooled. The crystalline solid was washed with ether and recrystallized from ethanol-ether, M.P. 83.5–84.5° C. Elemental analyses of the purified product gave the following results:

Calcd. for $C_9H_{13}NO_3$: percent C, 59.00; percent H, 7.07; percent N, 7.63. Found: percent C, 58.99, 59.03; percent H, 7.21, 7.10; percent N, 7.42, 7.32.

Further evidence for the structure of the product was obtained from its infrared spectrum which had bands characteristic of an N-substituted succinimide and also a hydroxyl absorbance band at 2.90μ. A study of the hydroxyl absorbance band indicated the same strong intramolecular hydrogen bonding as had been noted in the case of the N-(3-hydroxycyclopentyl)phthalimide. The N-(3-hydroxycyclopentyl)succinimide may be represented as:

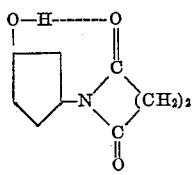

The hydrations of the N-substituted 3-aminocyclopentenes to give the N-substituted 3-aminocyclopentanols were effected in the foregoing examples by adding the substituted aminocyclopentenes to concentrated sulfuric acid, agitating the mixture until solution was attained, and adding the resulting solution to water. I have found that the sulfuric acid to which the N-substituted 3-aminocyclopentene is added should have a concentration of at least about 85%, and I prefer to use sulfuric acid having a concentration of about 95 to about 98%. Sufficient sulfuric acid to dissolve the N-substituted 3-aminocyclopentene completely should be used. In general, a sulfuric acid to substituted 3-aminocyclopentene weight ratio of about 3 to 1 has been found to be adequate for rapid dissolution and to provide a workable solution.

While addition of the liquid product of the reaction with concentrated sulfuric acid to water has been shown to give the desired N-substituted 3-aminocyclopentanol, I have found that, alternatively, the substituted 3-aminocyclopentanol may be obtained by adding the liquid product to aqueous sulfuric acid of a concentration such that the acid concentration of the resulting mixture is not greater than about 60%. Because of the higher final acid concentration in the latter procedure, this alternative may be particularly advantageous in a continuous or semicontinuous process wherein it is desirable to concentrate and then recycle the acid to the first step of the hydration process.

In most cases, the final hydration product is insoluble in water or dilute sulfuric acid and hence may be recovered by such simple techniques as filtration or centrifuging. In a few cases, the solubility of the final product requires other isolation techniques such as extraction.

Both steps of the hydration procedure of the present invention may be effected at temperatures between the freezing point of the solutions involved and about 30° C. Temperatures above about 30° C. lead to excessive charring and decomposition of the organic compounds involved. However, as the examples show, I have found it advantageous to operate the hydration at temperatures within the range of about −5 to about +10° C.

Example 5 shows that the N-substituted 3-aminocyclopentanols of the present invention are readily oxidized to the corresponding N-substituted glutamic acids without the attendant formation of the by-products encountered in my prior process.

Example 5

Vanadium pentoxide in the amount of 18.2 parts and copper in the amount of 54.5 parts were dissolved in 18,160 parts of 55% nitric acid in a 10-gallon stainless steel vessel equipped with a powerful agitator. While the temperature of this solution was maintained between 20 and 35° C., 1816 parts of N-(3-hydroxycyclopentyl)-phthalimide and 2460 parts of 95% nitric acid were added continuously over a period of one hour, the latter being used to maintain the initial nitric acid concentration as closely as possible. The mixture was agitated for an additional one and one-half hours and then was centrifuged. The solid N-phthaloylglutamic acid recovered was washed with zeolite-treated water and then was dried at room temperature. A portion of the acid filtrate corresponding to the amount of water formed in the reaction (less the amount of water removed with the solid N-phthaloylglutamic acid) was discarded. The remaining acid filtrate was recycled to the reactor, and the addition of the N-(3-hydroxycyclopentyl)phthalimide and of 95% nitric acid was repeated. No vanadium pentoxide or copper was added after the first run. In eleven cycles, the over-all conversion to N-phthaloylglutamic acid (based on the N-(3-hydroxycyclopentyl)-phthalimide introduced) was 85%. Even after twenty-nine consecutive cycles, neither N-phthaloylaspartic acid nor nitrated derivatives of the starting material were detected in the solid product or in the filtrates. The purity of the N-phthaloylglutamic acid as determined by chemical and infrared analyses was 99%. On the other hand, oxidation of N-(3-cyclopentenyl)phthalimide of my prior patent under similar conditions gave, in addition to a 67% conversion to N-phthaloylglutamic acid, 9% of N-phthaloylaspartic acid and 3% of N-(2,3-dinitrocyclopentyl)phthalimide (all based on the cyclopentenylphthalimide introduced).

The N-phthaloylglutamic acid obtained was hydrolyzed readily essentially by the procedure shown in my earlier patent except for replacement of the 70% nitric acid used with an equivalent of 15% hydrochloric acid and a reduction in the reaction time from 14 to 6 hours. Racemic glutamic acid of greater than 99% purity was obtained. The yield was 97%.

Preferably, the foregoing oxidation is effected with about 35 to about 70% nitric acid. An acid to imide weight ratio of about 10 to 1 has been found satisfactory both for oxidation and for providing a workable mixture. The reaction temperature suitably should be between about 25 and about 55° C. Superatmospheric pressures may be used to aid in gas retention. Reaction times of 2 to 3 hours are generally satisfactory.

Nitric acid is not the only suitable oxidant in the present process. Although they are less attractive in commercial operations, I may use any of the other common oxidizing agents such as chromic acid, alkaline permanganate, and the like. Likewise, although the N-(3-hydroxycyclopentyl)phthalimide is the preferred starting material for the oxidation step from the point of view of ease of preparation, etc., other N-(3-hydroxycyclopentyl) amides and imides such as the succinimide and the pyromellitimide of Examples 3 and 4, respectively, also may be used, or I can prepare and oxidize such derivatives as N,N'-bis(3-hydroxycyclopentyl)succinimde, N-(3-hydroxycyclopentyl)acetamide, N-(3-hydroxycyclopentyl)-benzamide, etc. As has been mentioned previously, the only requirement is that amide or imide to be oxidized be prepared from an organic mono- or polycarboxylic acid (or amide-forming derivative) which does not contain any readily oxidizable substituents.

As is apparent from the foregoing, the present invention affords a method for obtaining very pure racemic glutamic acid. The pure acid is desired as starting material for the monosodium salt of dextrorotatory glutamic acid, a flavor-enhancing agent now widely used in foods.

It will be evident to those skilled in the art that many modifications are possible in effecting the procedures described without departure from the spirit and scope of the invention. Hence, I intend to be limited only by the following claims.

I claim:
1. In the process of converting 3-aminocyclopentene to glutamic acid by oxidation with a chemical oxidizing agent, which process includes the essential intermediate step of first preparing an N-substituted 3-aminocyclopentene by reaction of said 3-aminocyclopentene with a reagent which will replace at least one amino hydrogen of said 3-aminocyclopentene with a substituent which is not subject to decomposition under the action of said oxidizing agent, said reagent being a member selected from the class consisting of the saturated aliphatic carboxylic acids, the aromatic carboxylic acids, and the amide-forming derivatives of such acids, the improvement which comprises the additional essential intermediate step of preparing an N-substituted 3-aminocyclopentanol by dissolving said N-substituted 3-aminocyclopentene in sulfuric acid having a concentration of at least about 85% at a temperature between the freezing point of said sulfuric acid and about 30° C. and thereafter adding said sulfuric acid solution to an aqueous medium having a sulfuric acid concentration below about 60% at the end of said addition at a temperature between the freezing point of said aqueous medium and about 30° C.

2. The process as claimed in claim 1, wherein said reagent is phthalic acid.

3. The process as claimed in claim 1, wherein said reagent is phthalic anhydride.

4. The process as claimed in claim 1, wherein the preparation of said N-substituted 3-aminocyclopentanol is effected at a temperature between about −5 and about +10° C.

5. The process as claimed in claim 1, wherein said N-substituted 3-aminocyclopentanol is converted to the corresponding N-substituted glutamic acid by the action of said oxidizing agent and the N-substituted glutamic acid is thereafter hydrolyzed to glutamic acid.

6. In an improved process for the preparation of glutamic acid from an alicyclic compound having a 5-membered carbon ring which tends to minimize the formation of aspartic acid derivatives and other undesirable organic by-products, the essential step of oxidizing an N-substituted 3-aminocyclopentanol having no substituents other than the amino and hydroxyl functions to open the alicyclic ring and to convert the same to a 5-membered chain having terminal carboxyl groups and the nitrogen atom positioned on a carbon atom alpha to one of said carboxyl groups.

7. In a process for the preparation of glutamic acid, the steps of preparing N-(3-hydroxycyclopentyl)phthalimide by dissolving N-(3-cyclopentenyl)phthalimide in sulfuric acid having a concentration of at least about 85% at a temperature between the freezing point of said sulfuric acid and about 30° C. and thereafter adding said sulfuric acid solution to an aqueous medium having a sulfuric acid concentration below about 60% at the end of said addition at a temperature between the freezing point of said aqueous medium and about 30° C.; oxidizing with nitric acid said N-(3-hydroxycyclopentyl)phthalimide to an N-substituted glutamic acid; and hydrolyzing the oxidized product to glutamic acid.

8. A new class of compounds having the general formula:

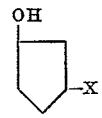

wherein X is a member of the group consisting of

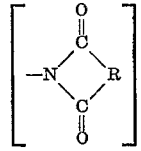

and

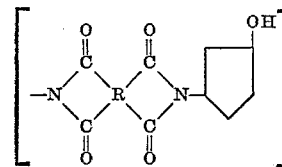

the R in each instance being selected from the group consisting of lower alkyl radicals and mononuclear carbocyclic aryl radicals having no easily oxidizable substituents.

9. N-(3-hydroxycyclopentyl)phthalimide.
10. N-(3-hydroxycyclopentyl)succinimide.
11. N,N'-bis(3-hydroxycyclopentyl)pyromellitimide.

References Cited in the file of this patent

UNITED STATES PATENTS

| | | |
|---|---|---|
| 2,791,606 | Novak et al. | May 7, 1957 |
| 2,801,250 | Sullivan | July 30, 1957 |
| 2,846,469 | Carron et al. | Aug. 15, 1958 |
| 2,859,218 | Stevens | Nov. 4, 1958 |

FOREIGN PATENTS

| | | |
|---|---|---|
| 454,042 | Great Britain | Sept 23, 1936 |

OTHER REFERENCES

Raiford et al.: J. Am. Chem. Soc., vol. 50, p. 1203 (1928).

Moe et al.: J. Am. Chem. Soc., vol. 71, p. 1252 (1949).

Dersin: Ber., vol. 54B, p. 3158 (1921).